US010706322B1

(12) United States Patent
Yang et al.

(10) Patent No.: US 10,706,322 B1
(45) Date of Patent: Jul. 7, 2020

(54) SEMANTIC ORDERING OF IMAGE TEXT (71) Applicant: Amazon Technologies, Inc., Seattle, WA (US)

(72) Inventors: Shuo Yang, Seattle, WA (US); Hao Wu, Seattle, WA (US); Jonathan Wu, Seattle, WA (US); Meng Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 224 days.

(21) Appl. No.: 15/821,629

(22) Filed: Nov. 22, 2017

(51) Int. Cl.
*G06K 9/34* (2006.01)
*G06K 9/62* (2006.01)
*G06T 7/70* (2017.01)
*G06K 9/72* (2006.01)

(52) U.S. Cl.
CPC ........... *G06K 9/6218* (2013.01); *G06K 9/726* (2013.01); *G06T 7/70* (2017.01); *G06T 2210/12* (2013.01)

(58) Field of Classification Search
CPC ........ G06K 9/6218; G06K 9/726; G06T 7/70; G06T 2210/12
See application file for complete search history.

(56) References Cited

U.S. PATENT DOCUMENTS

| 8,185,398 | B2* | 5/2012 | Anderson | G06F 17/211 |
| | | | | 382/103 |
| 8,233,671 | B2* | 7/2012 | Anderson | G06K 9/00463 |
| | | | | 382/114 |
| 9,092,674 | B2* | 7/2015 | Andrade | G06F 40/58 |
| 9,355,313 | B2* | 5/2016 | Sesum | G06K 9/00469 |
| 9,424,668 | B1* | 8/2016 | Petrou | G06T 11/206 |
| 2014/0328540 | A1* | 11/2014 | Wang | G06K 9/00476 |
| | | | | 382/173 |
| 2018/0336405 | A1* | 11/2018 | Messina | G06K 9/342 |

* cited by examiner

*Primary Examiner* — Gregory M Desire
(74) *Attorney, Agent, or Firm* — Knobbe, Martens, Olson & Bear, LLP (57) ABSTRACT

Embodiments of the present disclosure provide systems and processes for automatically determining a layout of text within an image that makes sense from a semantic perspective. In certain embodiments, the systems disclosed herein receive bounding box information relating to one or more bounding boxes that surround text within the image. The systems compare the received bounding box information to determine a clustering of bounding boxes that have an above threshold probability of including words that when read in order make sense semantically. For example, systems herein can determine whether words in a cluster correspond to a line of text.

20 Claims, 10 Drawing Sheets

BOUNDING BOX CLUSTERING PROCESS

SEMANTIC ORDERING OF IMAGE TEXT

BACKGROUND

Image analysis services are used to analyze an image of a scene and determine if one or more objects are present in the image. Frequently, images include text that is difficult to detect due to the positioning of the text and a lack of context associated with the words or characters of the text.

In many applications (e.g., military, law enforcement, and security applications), detailed information concerning text-based regions of an image is desired. However, due to a lack of granularity in the detection phase, certain image processing systems are limited in the level of information that can be provided regarding portions of an image that include text. Accordingly, conventional image processing systems ineffectively process text-based regions of images.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Introduction

Some systems are capable of identifying text included in an image. However, many of the text identifying systems are incapable of determining the semantics or meaning of the text depicted in the image. As a result, it can be challenging or impossible for such systems to determine an ordering for the words included in the image. Further, making an assumption that text should be read from left to right and from top to bottom can lead to nonsensical ordering of text within the image. For example, a newspaper or magazine may include columns of text that may be broken or interrupted by a number of elements, such as a title, graphics, or pull-quotes. These elements that can break the flow of text can lead to a nonsensical reading of text when a strict ordering of text is maintained when analyzing the text. For example, suppose that the newspaper with the title "newspaper" includes an article about a kitten stuck in a tree. Further, suppose that the title of the newspaper is at the same vertical position as the first three lines of the article instead of being above the article. In other words, suppose that the newspaper appears as follows:

| | | |
|---|---|---|
| There was a kitten stuck in a tree. The girl who owned the kitten was sad | NEWSPAPER | and called for help. The local fire department was notified and helped to . . . |

An automated system processing an image of the above newspaper might read the article as follows: there was a kitten stuck newspaper and called for help. Such a reading of the article would be nonsensical. However, it can be difficult for an automated system to determine that reading the text of the image in what is a traditional order in the English language could lead to a nonsensical result.

Embodiments of the present disclosure provide systems and processes for automatically determining a layout of text within an image that makes sense from a semantic perspective. In certain embodiments, the systems disclosed herein receive bounding box information relating to one or more bounding boxes that surround text within the image. The systems compare the received bounding box information to determine a clustering of bounding boxes that have below a threshold distance between them. For example, systems herein can determine whether words in a cluster correspond to a line of text based at least in part on the distance between bounding boxes being less than a threshold.

In certain embodiments, words include distinct meaningful elements of speech or writing. Further, in some embodiments, words include sets of alphanumeric characters that are grouped together. Moreover, in certain embodiments, the set of alphanumeric characters have meaning only in a particular context. For example, with reference to FIG. 5, in certain embodiments the set of numbers in the bottom left of the billboard are identified as a word using one or more of the processes described herein.

Example Networked Computing Environment

Figure 1:
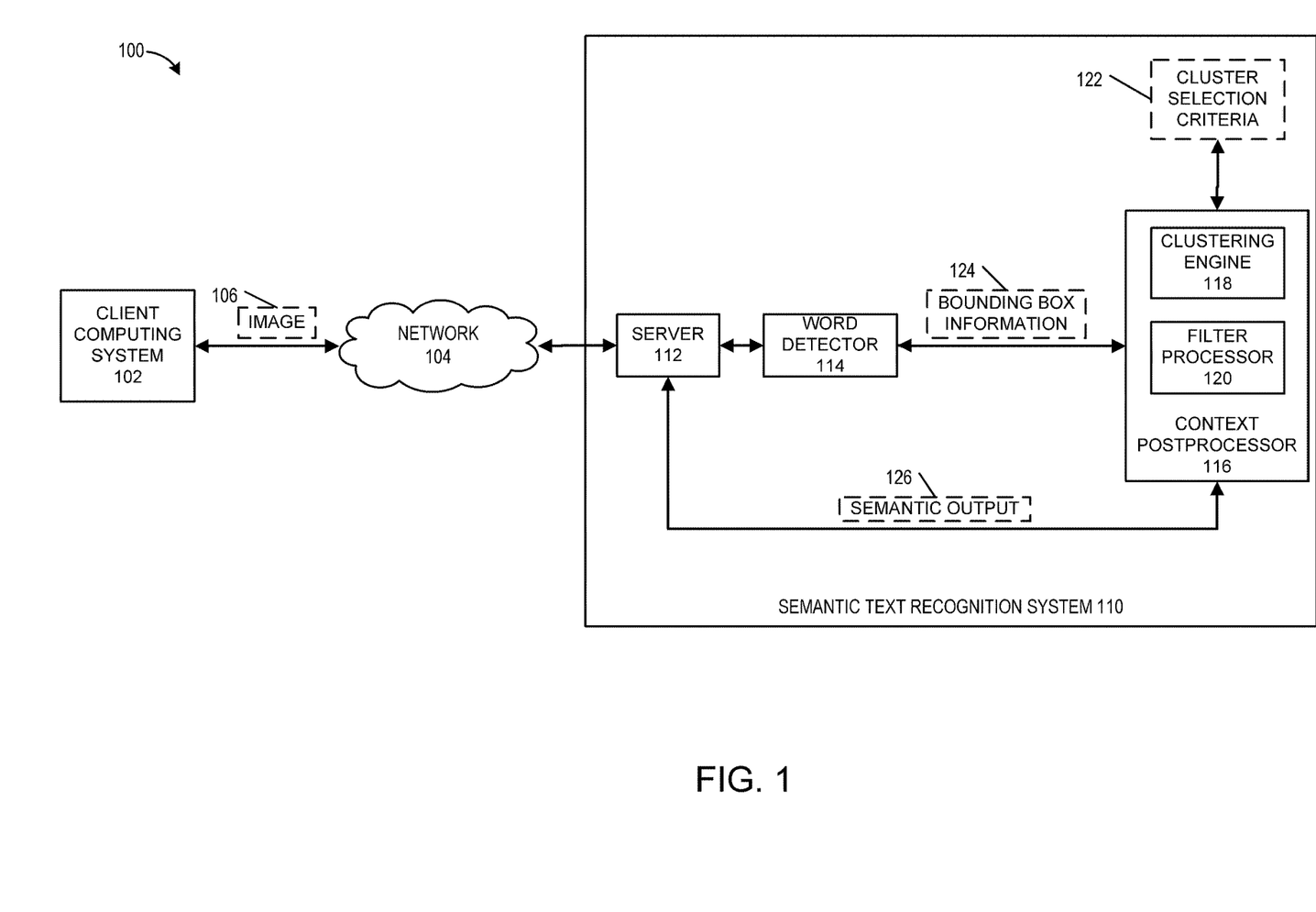
FIG. 1 illustrates an embodiment of a networked computing environment including a semantic text recognition system.

FIG. 1 illustrates an embodiment of a networked computing environment 100 including a semantic text recognition system 110. In certain embodiments, the semantic text recognition system 110 determines a layout of text within an image and determines an ordering of words associated with a semantic meaning. For example, the semantic text recognition system 110 determines a set of words depicted in an image that form a line of text. In certain embodiments, the semantic text recognition system 110 includes one or more servers 112, a word detector 114, and a context postprocessor 116.

In some embodiments, the server 112 is a computing system that provides access to features of the semantic text recognition system 110. A client computing system 102 can communicate with the semantic text recognition system 110 by communicating with the server 112. In certain embodiments, the client computing system 102 communicates with the semantic text recognition system 110 via a network 104. In certain embodiments, the client computing system 102 provides an image 106 to the semantic text recognition system 110 for analysis. The semantic text recognition system 110 analyzes the image 106 to detect words depicted within the image 106.

The word detector 114 includes any system that can detect one or more words within the image 106. In certain embodiments, the word detector 114 generates a bounding box around each word depicted in the image 106. The bounding box outlines the word within a coordinate space defined for the image 106. In certain embodiments, a word is separated into portions with each portion being surrounded by a different bounding box. In some embodiments, the word detector 114 is or includes an image text recognition system, such as the image text recognition system described in U.S. application Ser. No. 15/641,774 ("the '774 application") filed on Jul. 5, 2017 and titled "IMAGE TEXT RECOGNITION," the disclosure of which is hereby incorporated by reference in its entirety herein.

The word detector 114 provides bounding box information 124 to a context postprocessor 116. In certain embodiments, the bounding box information 124 includes coordinates for the corners of each bounding box that surrounds each word or portion of the word identified by the word detector 114. Further, in certain embodiments, the bounding box information 124 includes orientation information for the word within the bounding box. This orientation information identifies the direction in which the word is oriented within the bounding box.

In certain embodiments, the context postprocessor 116 uses the bounding box information 124 to determine metadata about the bounding box and/or the word included inside the bounding box. Further, in certain embodiments, the context postprocessor 116 determines metadata relating to relationships between pairs of bounding boxes. For example, in certain embodiments, the context postprocessor 116 determines a distance between two bounding boxes.

In certain embodiments, the context postprocessor 116 includes a clustering engine 118 and a filter processor 120. The clustering engine 118 performs one or more clustering algorithms to cluster bounding boxes from a set of bounding box is identified by the word detector 114. In certain embodiments, the clustering engine 118 uses the bounding box information 124 provided by the word detector 114 to perform the clustering processes.

In certain embodiments, the context postprocessor 116 receives cluster selection criteria 122. This cluster selection criteria 122, in some embodiments, is received from a user, such as a user of the client computing system 102, or an administrator of the semantic text recognition system 110. In some embodiments, the filter processor 120 filters out clusters of bounding boxes or selects a cluster of bounding boxes based on the cluster selection criteria 122.

The context postprocessor 116, in some embodiments, can perform post-processing on a selected cluster of bounding boxes. In certain embodiments, the post-processing includes orienting words within the bounding boxes included in the cluster bounding boxes. In some embodiments, the words are oriented with respect to a particular coordinate space, such as an XY coordinate space or a coordinate space matching an orientation of objects depicted within the image.

In certain embodiments, the semantic text recognition system 110 is implemented using computer hardware, such as one or more hardware processors and non-volatile memory. Further, in some embodiments, the semantic text recognition system 110 includes a number of systems that facilitate implementing the processes described herein. These systems are implemented in computer hardware. For instance, the semantic text recognition system 110 includes one or more servers 112, which, in certain embodiments, are implemented in hardware, for receiving and responding to network requests from the client computing system 102. However, in some embodiments, some of the capabilities of the servers 112 are implemented in software. In certain embodiments, the one or more servers 112 include a variety of different server types including network servers, web servers, application servers, database servers, and combinations of the same, or the like. Although the semantic text recognition system 110, in certain embodiments, includes one or more servers 220, the present disclosure is not limited for use with systems that employ a client/server architecture. Further, in certain embodiments, the word detector 114 and/or the context postprocessor 116 are also implemented using computer hardware.

In some embodiments, the network 104 includes any type of communication network. For example, the network 104, in certain embodiments, includes one or more of a wide area network (WAN), a local area network (LAN), a cellular network, an ad hoc network, a satellite network, a wired network, a wireless network, etc. Further, in some cases, the network 204 includes the Internet.

Example Semantic Word Ordering Process

Figure 2:
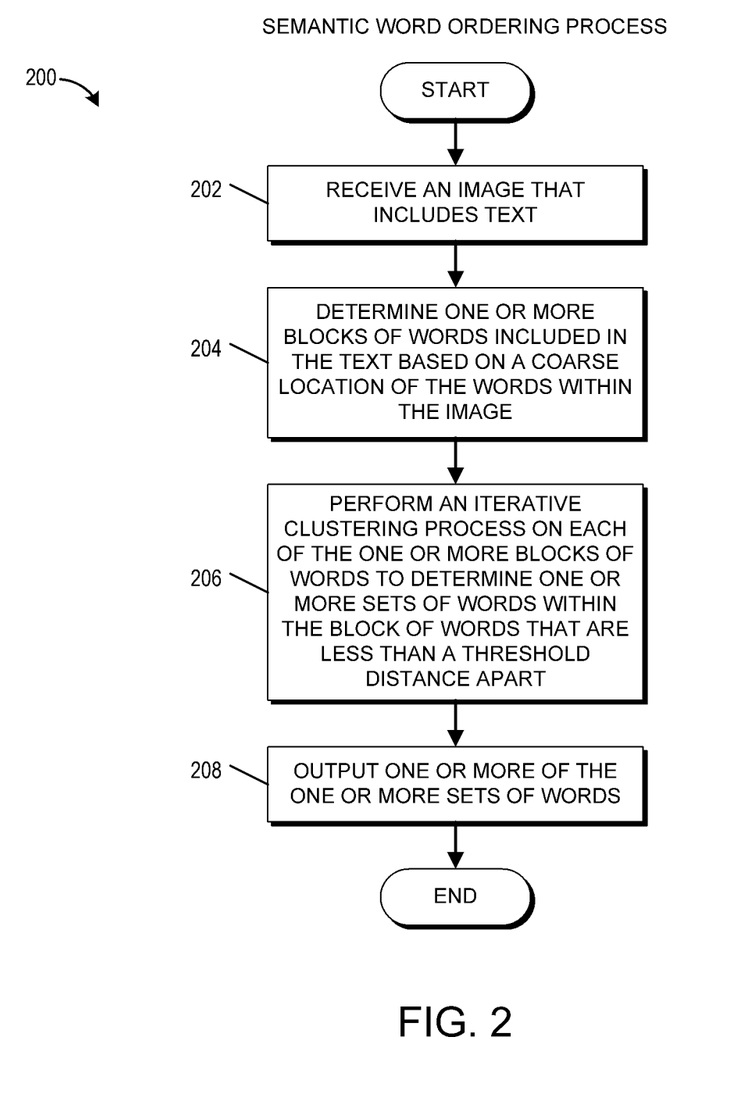
FIG. 2 illustrates a flowchart of an embodiment of a semantic word ordering process.

FIG. 2 illustrates a flowchart of an embodiment of a semantic word ordering process 200. In certain embodiments, the process 200 is implemented by any system that can cluster a set of words identified in an image to determine an ordering of the words associated with a semantic meaning. For example, the process 200, in whole or in part, can be implemented by a semantic text recognition system 110, word detector 114, a context postprocessor 116, a clustering engine 118, or a filter processor, among others. Although any number of systems, in whole or in part, can implement the process 200, to simplify discussion, the process 200 will be described with respect to particular systems.

In certain embodiments, the process 200 is performed in response to a command from a user, such as an administrator. In certain embodiments, the process 200 is performed in response to receiving an image. In some embodiments, the process 200 is performed in response to receiving an image that includes text.

The process 200 begins at block 202 where, for example, the word detector 114 receives an image 106 that includes text. In some embodiments, the image includes or depicts additional objects besides text. For example, as illustrated with respect to FIG. 5, in certain embodiments, the image is of a billboard that includes, in addition to the text, a depiction of the structure that holds the advertisement, some portion of a tree, the sky, in some power lines. It should be understood that the present disclosure is not limited by the types of non-text objects included within the image.

Figure 7:
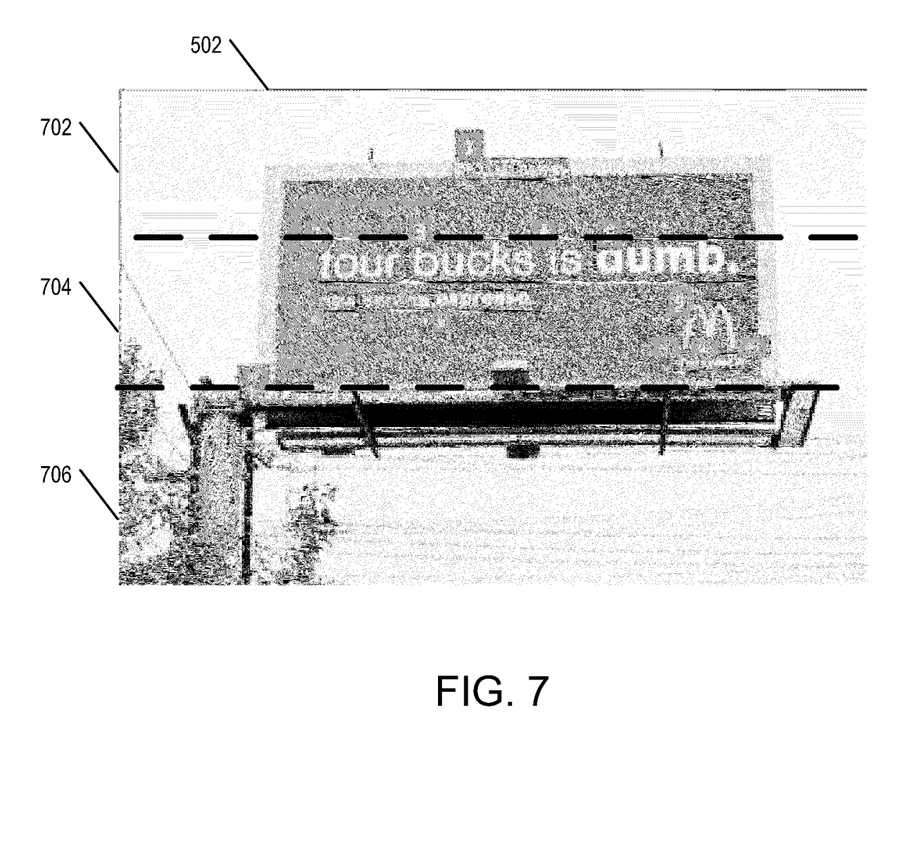
FIG. 7 illustrates an example of the image of FIG. 5 divided into regions in accordance with certain embodiments.

At block 204, the word detector 114 determines one or more blocks of words included in the text based at least in part on a course location of the words within the image. For example, as illustrated in FIG. 7, the image, in certain embodiments, is divided into three regions: an upper region, a center region, a lower region. In some embodiments, the block 204 includes identifying all the words within the image or words within a particular portion of the image, such as the center region. In some embodiments, the word detector 114 identifies words illustrated in the image using an image text recognition system, such as the image text recognition system described in the '774 application previously incorporated by reference herein. In some embodiments, identifying the words illustrated in the image includes identifying or creating bounding boxes that surround each word, or in some cases, portions of words depicted in the image. Further, in some embodiments, identifying bounding boxes includes determining coordinates of the bounding boxes within a coordinate space defined with respect to the image. For example, in certain embodiments, an XY coordinate space or Euclidean coordinate space is overlaid on the image 106 with an origin coordinate in the center of the image or a particular corner of the image. Coordinates for the bounding boxes, in some embodiments, is determined based on the origin coordinate. In some embodiments, the block 204 is optional or omitted. In some such embodiments, the locations of all the words within the image are provided to the context postprocessor 116. In certain embodiments, providing the location of words within the image includes providing bounding box information 124 to the context postprocessor 116.

At block 206, the clustering engine 118 performs an iterative clustering process in each of the one or more blocks of words to determine one or more sets of words that are spaced less than a threshold distance apart. In certain embodiments, the iterative clustering process is performed to determine one or more sets of words within the block of words having an above threshold probability of having semantic meaning. In certain embodiments, the clustering process is a density-based spatial clustering of applications with noise (DBSCAN) process. In some embodiments, iterative clustering process includes a mean shift clustering process, a centroid-based clustering process, a density-based clustering process, or a connectivity-based clustering process. The iterative clustering process, in certain embodiments, is repeated until each cluster has less than a threshold number of words within the cluster.

In some embodiments, the threshold number of words is determined using a machine learning process. Some nonlimiting examples of machine learning algorithms that can be used to generate and update parameter functions or prediction models to determine the threshold number of words to include in the cluster can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

In some embodiments, the blocks of words having an above threshold probability of having semantic meaning correspond to lines of words, such as a phrase or sentence. Further, in some embodiments, the blocks of words correspond to a single word. Additional details regarding the clustering process are provided below with respect to FIG. 3.

At block 208, the context postprocessor 116 outputs one or more of the one or more sets of words. In certain embodiments, outputting one or more of the words includes providing the words to another application for additional processing. In some embodiments, outputting the one or more words includes providing an audio, a visual, or an audio and visual output of the words. In some embodiments, the block 208 includes performing post-processing on the words, such as a raster scan process or an optical character recognition process. This raster scan process, in certain embodiments, is used to determine the order of the words or the order of lines of blocks of words within the image 106.

Example Bounding Box Clustering Process

Figure 3:
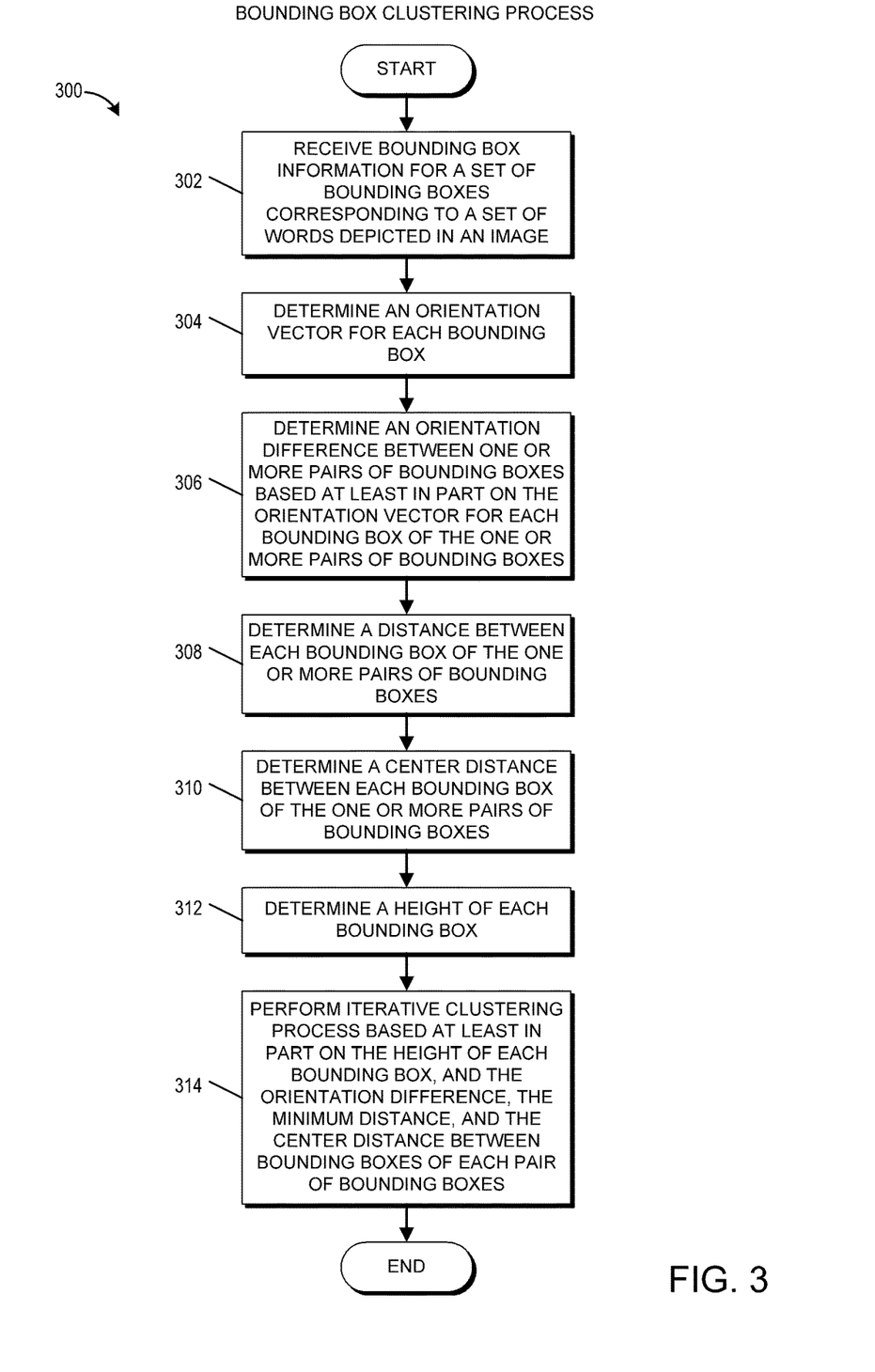
FIG. 3 illustrates a flowchart of an embodiment of a bounding box clustering process.

FIG. 3 illustrates a flowchart of an embodiment of a bounding box clustering process 300. In certain embodiments, the process 300 is implemented by any system that can cluster a set of bounding boxes corresponding to a set of one or more words depicted in an image to determine an ordering of the words with an above-threshold probability of being associated with a semantic meaning. For example, the process 300, in whole or in part, can be implemented by a semantic text recognition system 110, word detector 114, a context postprocessor 116, a clustering engine 118, or a filter processor, among others. Although any number of systems, in whole or in part, can implement the process 300, to simplify discussion, the process 300 will be described with respect to particular systems.

In certain embodiments, the process 300 is performed in response to a command from a user, such as an administrator. In some embodiments, the process 300 is performed in response to receiving an image with text or receiving bounding box information associated with words identified in an image. In some embodiments, the order of at least some of the operations performed with respect to the process 300 is performed in a different order or in parallel.

The process 300 begins at block 302 where, for example, the context postprocessor 116 receives bounding box information 124 for a set bounding boxes corresponding to a set of words depicted in an image 106. In certain embodiments, the bounding box information 124 includes, for each bounding box, coordinates of particular points of the bounding box, such as coordinates of the corners of the bounding box with respect to a coordinate space defined with respect to the image 106. In addition, in some embodiments, the bounding box information 124 includes an orientation of the word or portion of the word included in each bounding box. In some embodiments, the orientation of the word or the portion of the word included in the bounding box differs from the orientation of the bounding box itself with respect to the coordinate space defined for the image 106. In some embodiments, the bounding box information 124 is for a subset of bounding boxes determined for the image 106. For example, in certain embodiments, using the process 200, a subset of a block of words is identified for the image 106, such as words depicted in a particular region of the image 106. In this example, the bounding box information 124 includes information corresponding to the subset of the block of words. In some embodiments, the bounding box information includes a location of each word within the image 106.

At block 304, the context postprocessor 116 determines an orientation vector for each bounding box. In certain embodiments, the orientation vector is determined based at least in part on the coordinates received as part of the bounding box information 124 received at the block 302. The orientation vector is determined, in certain embodiments, for each bounding box corresponding to each word or portion of the word depicted in the image 106. In other embodiments, the orientation vector is determined for a subset of bounding boxes.

At block 306, the context postprocessor 116 determines an orientation difference between one or more pairs of bounding boxes based at least in part on the orientation vector for each bounding box of the one or more pairs of bounding boxes. In some embodiments, the orientation difference between pairs of bounding boxes is determined for every possible pairing of bounding boxes for the set of bounding boxes. In other embodiments, the orientation difference between pairs of bounding boxes is determined for a subset of the set of bounding boxes. For example, the orientation difference, in certain embodiments, is determined only for bounding boxes that are neighbors. As another example, in certain embodiments, the orientation difference is determined only for pairs of bounding boxes that are located within one or more particular regions of the image 106. In some embodiments, the orientation difference between a pair of bounding boxes is determined using a measure of cosine similarity between the pair of bounding boxes.

At block 308, the context postprocessor 116 determines a distance between each bounding box of the one or more pairs of bounding boxes. In certain embodiments, the distance determined at the block 308 is a minimum distance between a pair of bounding boxes. The distance is calculated, in certain embodiments, between a corner of each bounding box that is closest to each other. In certain embodiments where multiple corners of a pair of bounding boxes are equal distance from each other, the pair of corners is selected at random or using any other selection process. In some embodiments, the distance is calculated based on the sides of a pair of bounding boxes that are closest to each other. As with the block 306, operations performed with respect to the block 308, in certain embodiments, are performed for every pairing of bounding boxes or for a subset of pairs of bounding boxes.

At block 310, the context postprocessor 116 determines a center distance between each bounding box of the one or more pairs of bounding boxes. In certain embodiments, the center distance determined at the block 310 is a distance between a center of each bounding box of a pair of bounding boxes. As with the block 306, in certain embodiments, operations performed with respect to the block 308 are performed for every pairing of bounding boxes or for a subset of pairs of bounding boxes. In certain embodiments, for a particular pair of bounding boxes, the minimum distance determined at the block 308 and the center distance determined at the block 310 are similar (e.g., the same, less than 5 or 10% different, or less than a threshold different). In other embodiments, the minimum distance determined at the block 308 and the center distance determined at the block 310 are significantly different (e.g., more than 10 or 25% different or more than a threshold different). Further, in some embodiments, a pair of sequential words and a pair of stacked words have an equal minimum distance between the bounding boxes surrounding the two pairs of words. However, in some such embodiments, the center distance between the pair of words that are stacked is substantially less than the sequential pair of words, particularly if the words are more than one or two characters each.

In certain embodiments, the values determined at the blocks 306, 308, and 310 are determined by comparing coordinates of two bounding boxes or comparing data derived based on the coordinates of two bounding boxes. Thus, in certain embodiments, the values determined at the blocks 306, 308, and 310 are referred to as comparative data.

At block 312, the context postprocessor 116 determines a height of each bounding box. In certain embodiments, the height of each bounding boxes determined based at least in part on the coordinates for each bounding box provided as part of the bounding box information 124. In some embodiments, determining the height of the bounding box includes determining a height axis of the bounding box with respect to a coordinate space applied to the image 106. Further, in certain embodiments, the height axis of the bounding boxes determined based at least in part on an orientation of the bounding box and the orientation of words within the bounding box with respect to the coordinate space applied to the image 106.

In some embodiments, the height of the bounding box is used to infer the font size of words within the bounding box. For example, a first bounding box that is twice the height of a second bounding box can be inferred to have a word in a larger font than the word included in the second bounding box. Consequently, in certain embodiments, it can be inferred that the words in the first bounding box and the second bounding box are less likely to make semantic sense as part of a single line of text that a pair of words in bounding boxes of the same height.

At block 314, the clustering engine 118 performs an iterative clustering process based at least in part on the height of each bounding box, and the orientation difference, the minimum distance, and the center distance between bounding boxes of each pair of bounding boxes. In some embodiments, the iterative clustering processes performed based at least in part on identification of the neighbors of each of the bounding boxes. For example, a direct neighbor of a bounding box is more likely to be clustered with the bounding box than a bounding box that is separated by other bounding boxes or by other objects within the image. In some embodiments, a cluster is determined based on a number of neighbors within a particular distance of the bounding boxes within the cluster.

In certain embodiments, the clustering process is performed once. In other embodiments, the clustering process is performed a threshold number of times. In yet other embodiments, the clustering process is performed until the number of bounding boxes and/or words within each cluster satisfies a particular threshold or is less than a threshold number of words. In certain embodiments, the particular threshold is determined based on the probability that the cluster of words included in the threshold will make semantic sense. In some embodiments, the particular threshold varies based on the type of image. For example, in certain embodiments, an image of a business card is associated with a threshold that allows fewer words or bounding boxes per cluster than an image of a page in a book. In certain embodiments, the threshold is determined using a machine learning process. Moreover, in certain embodiments, the threshold varies over time as the machine learning process is repeated using additional training data.

In certain embodiments, one or more of the blocks 304 to 312 are optional or omitted. In such embodiments, the block 314 performs the iterative clustering process based on the metadata that is obtained for each of the bounding blocks. For example, if the block 312 is omitted, the clustering process is performed at the block 314 without consideration of the height of each of the bounding box.

Example Semantically Ordered Word Output Process

Figure 4:
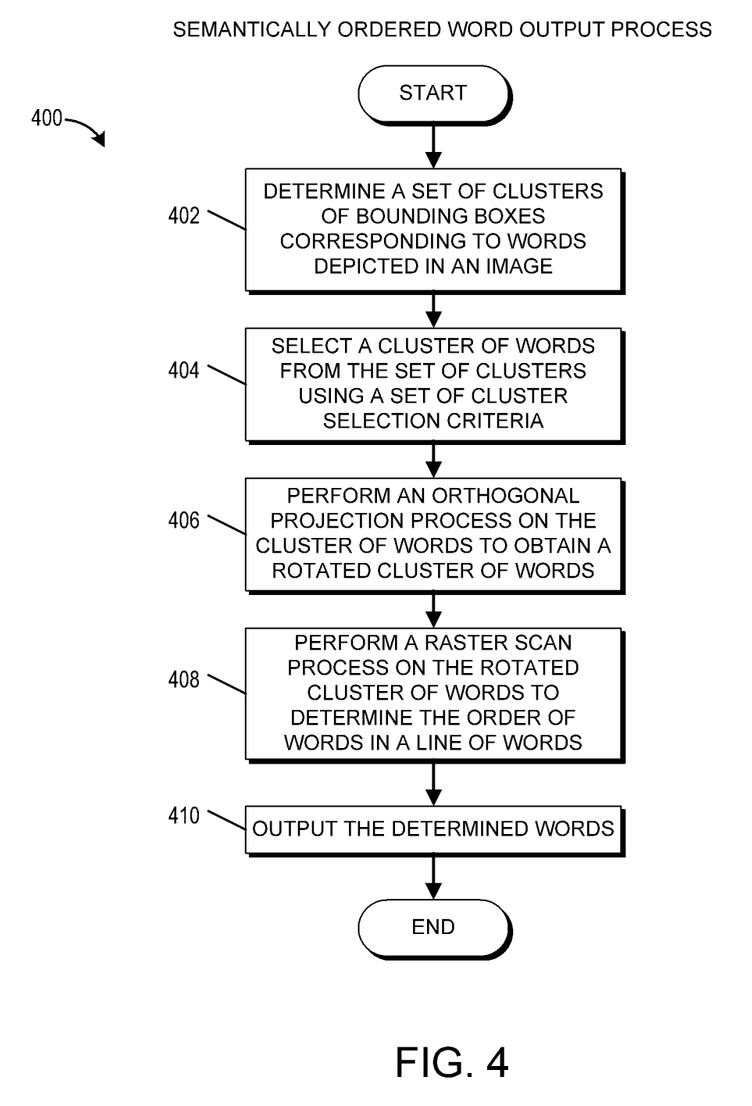
FIG. 4 illustrates a flowchart of an embodiment of a semantically ordered word output process.

FIG. 4 illustrates a flowchart of an embodiment of a semantically ordered word output process 400. In certain embodiments, the process 400 is implemented by any system that can output a line or block of words identified in an image that makes semantic sense. For example, the process 400, in whole or in part, can be implemented by a semantic text recognition system 110, word detector 114, a context postprocessor 116, a clustering engine 118, or a filter processor, among others. Although any number of systems, in whole or in part, can implement the process 400, to simplify discussion, the process 400 will be described with respect to particular systems.

In certain embodiments, the process 400 is performed in response to a command from a user, such as an administrator. In some embodiments, the process 400 is performed in response to receiving an image with text or receiving bounding box information associated with words identified in an image. In some embodiments, the process 400 is performed responsive to a command from an application. For example, an address book application, in certain embodiments, provides an image of a business card to the semantic text recognition system 110 and request that words be identified that make sense semantically (e.g., address information) and that the identified words be provided to the address book application for subsequent processing by the address book application (e.g., stored in an entry associated with the user identified on the business card).

The process 400 begins at block 402 where, for example, the clustering engine 118 determines a set of clusters of bounding boxes corresponding to words depicted in an image 106. In some embodiments, the block 402 includes performing the process 300.

At block 404, the filter processor 120 selects a cluster of words from the set of clusters using a set of cluster selection criteria 122. In some embodiments, the set of cluster selection criteria 122 includes a number of words to process, or a number of lines or blocks of words to output. In some embodiments, the set of cluster selection criteria 122 includes determining a font size of the words in the cluster of words and selecting a cluster of words based on the font size of the words. In some embodiments, the set of cluster selection criteria 122 includes a location of the cluster of words within the image. For example, in some embodiments, words of a larger font size or that are located more centrally in the image are more likely to be of value or to disclose information of value compared to words in the image that are of the smaller font or less centrally located. In some embodiments, the cluster of words is selected based on a width, height, or angle of the bounding box, or a confidence in the accuracy of the bounding box with respect to the word that the bounding box surrounds. Advantageously, in certain embodiments, by performing the remainder of the process 400 on a subset of words is set of all the words included in the image 106, processor utilization can be reduced compared to performing the process on the entire image 106. By reducing the amount of processor utilization used to process the image 106, a greater amount of processor resources, in certain embodiments, is made available for other applications or uses. In some embodiments, the block 404 is optional or omitted. For example, in some embodiments, the process 400 is performed for each of the clusters identified at the block 402.

At block 406, the context postprocessor 116 performs an orthogonal projection process on the cluster of words to obtain a rotated cluster of words. In certain embodiments, the orthogonal projection process includes projecting a bounding box along a vector of the orientation of the bounding box. In some embodiments, the orthogonal projection process includes projecting a word within the bounding box along a vector of the orientation of the bounding box.

At block 408, the context postprocessor 116 performs a raster scan process on the rotated cluster of words to determine the order of words in a line of words. In certain embodiments, the line of words corresponds to the cluster of words selected at the block 404. In some embodiments, the raster scan process is used to determine the words in the cluster words. In some embodiments, the block 408 includes performing an optical character recognition process on the rotated cluster of words.

At block 410, the context postprocessor 116 outputs the words (e.g., the semantic output 126) determined at the block 408. In some embodiments, the block 410 includes outputting the words to a target application for subsequent processing. For example, in certain embodiments, the words are provided to a digital or electronic address book, a reading application, a search application, the storage indexing application, or any other type of application that, in certain embodiments, performs an operation based at least in part on the words included in the image 106. In certain embodiments, the block 410 includes outputting the words visually and/or as an audio output. In some embodiments, the block 410 includes providing the words to a client computing system 102. The client computing system 102, in some embodiments, present the words to a user.

Advantageously, certain embodiments disclosed herein improve the probability that words selected for output to a user or to another application makes semantic sense compared to applications that determine the words included in an image in a particular defined order, such as from top to bottom and left to right. Moreover, the processes described herein, in certain embodiments, can group portions of words together to identify entire words depicted in an image 106. For example, an image of a curved object, such as a round soup can, can be challenging for some image processing applications to process. Words depicted on the round soup can, in some cases, be broken into parts by an image processing application. In some such cases, some text recognition applications fail to determine that the parts of the word should be combined to form a single word. For example, the word "chicken," in some cases, appears as "ch," "ick," and "en" with each portion of the word surrounded with a separate bounding box due to the curvature of the can. In contrast, embodiments of the present disclosure, can cluster the portions of the word together and process it as a single word.

Example Use Case

Figure 5:
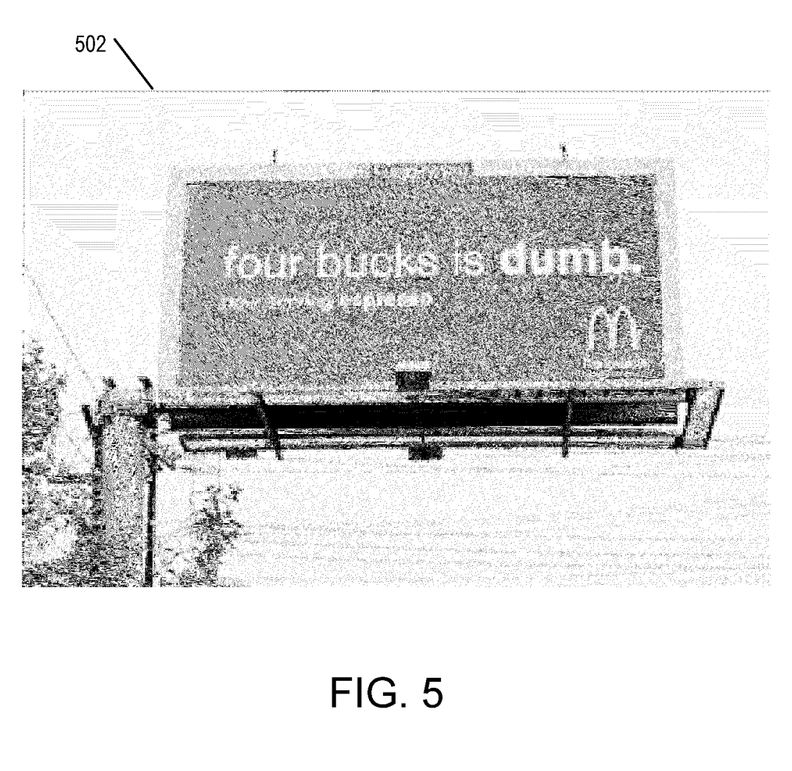
FIG. 5 illustrates an example of an image that can be processed using embodiments described herein.

FIG. 5 illustrates an example of an image 502 that can be processed using embodiments described herein. The image 502 is a photograph that depicts a billboard with an advertisement. The advertisement includes some text. Further, the image 502 includes some text that is separate from the advertisement. In addition, the image 502 includes objects that are independent of the text and the advertisement, such as portions of a tree, some power lines, and the billboard structure holding the advertisement. Using the processes 200, 300, 400 words included in the image 502 can be identified and processed to determine clusters of words that semantically makes sense when output together.

Figure 6:
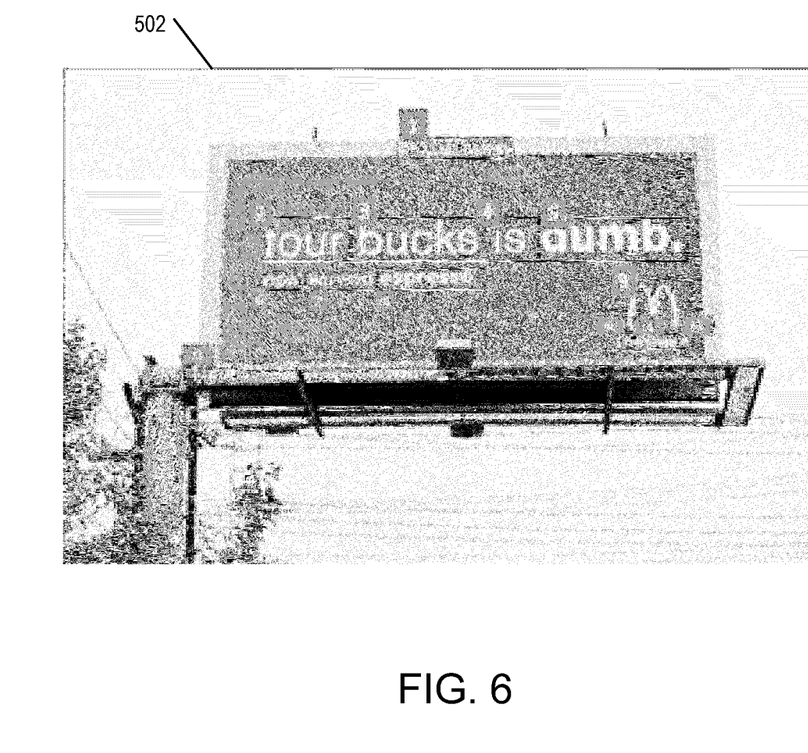
FIG. 6 illustrates an example of the image of FIG. 5 with annotated bounding boxes in accordance with certain embodiments.

In some embodiments, processing the image 502 includes identifying the words in the image. FIG. 6 illustrates an example of the image 502 of FIG. 5 with annotated bounding boxes in accordance with certain embodiments. As illustrated in FIG. 6, each of the words in the image 502 is annotated with a bounding box. The word detector 114, in some embodiments, identifies 13 different words within the image 502 including the set of numbers at the bottom left of the billboard and the large and the McDonalds® symbol in the bottom right of the billboard.

As previously described, in some embodiments each of the words within the image 502 are processed to determine the lines of words, or other word groupings, that have semantic meaning when read together. Alternatively, in certain embodiments, the image 502 is divided into regions with only words within one or more particular regions being processed to identify lines of words, or other word groupings. FIG. 7 illustrates an example of the image 502 of FIG. 5 divided into regions in accordance with certain embodiments. In the example illustrated in FIG. 7, the image 502 is divided into three regions: an upper region 702, a middle region 704, and a lower region 706. In certain embodiments each of the regions are of equal size. In other embodiments, as illustrated in FIG. 7, the regions are of varying size. In some embodiments, the definition of the regions is based at least in part on a number of factors including, for example, the size of the image 502, a number of words and/or bounding boxes within each of the regions, a density of words and/or bounding boxes within each of the regions, a size of each word and/or bounding box within each of the regions, or any other criteria that may be used to determine the number of regions and/or the size of the regions into which to divide the image 502.

It should be understood that the number of regions, in certain embodiments, varies based on one or more of the aforementioned factors. Further, in certain embodiments, a selection of the region to process is based at least in part on one or more of the aforementioned factors. For example, in some embodiments, the region 704 is selected for further processing using, for example, the processes 300 and 400 based at least in part on the greater number of bounding boxes within the region 704 (11 bounding boxes) compared to the regions 702 and 706, which each include a single bounding box.

Figure 8:
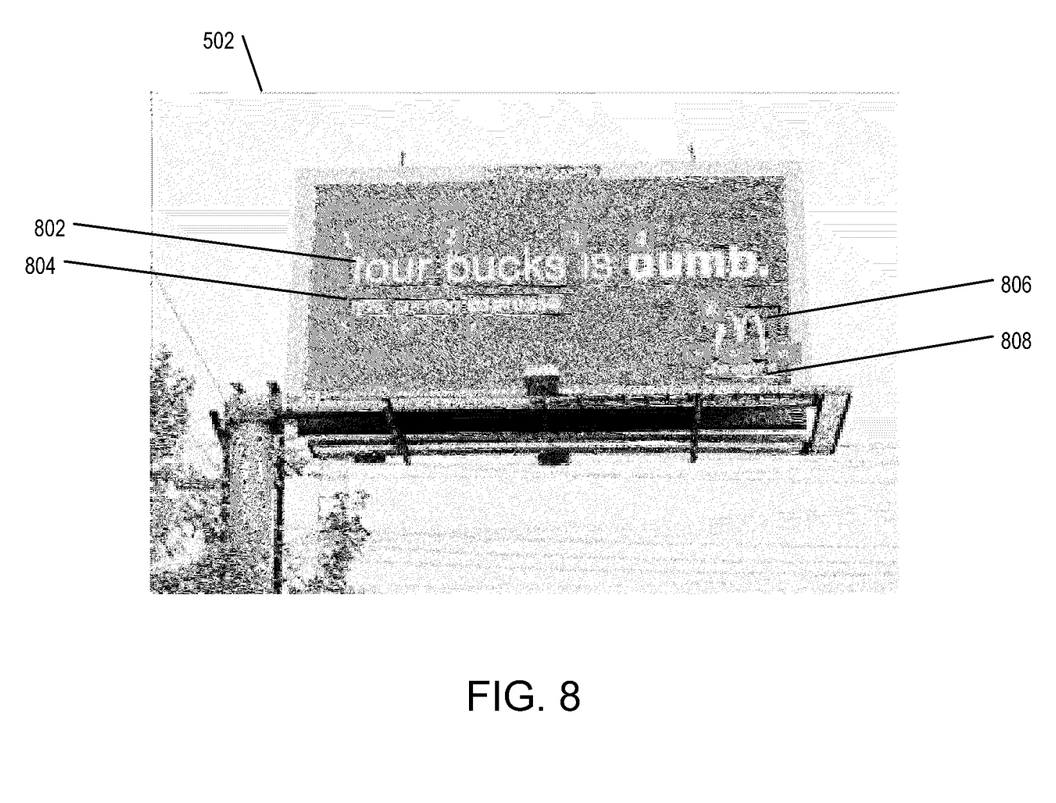
FIG. 8 illustrates an example of the image of FIG. 5 with annotated bounding boxes for a first subset of text in accordance with certain embodiments.

FIG. 8 illustrates an example of the image 502 of FIG. 5 with annotated bounding boxes for a first subset of text in accordance with certain embodiments. In certain embodiments, as illustrated in FIG. 8, the first subset of text includes all of the text within the region 704 defined with respect to FIG. 7. The bounding boxes for the first subset of text, in certain embodiments, is processed using the processes 300 and 400 to output the annotated text of FIG. 8 is one or more lines or blocks of text. For example, in certain embodiments, each of rows 802, 804, 806, and 808 is identified as separate lines of text, which, in some embodiments, are each be output separately.

Figure 9:
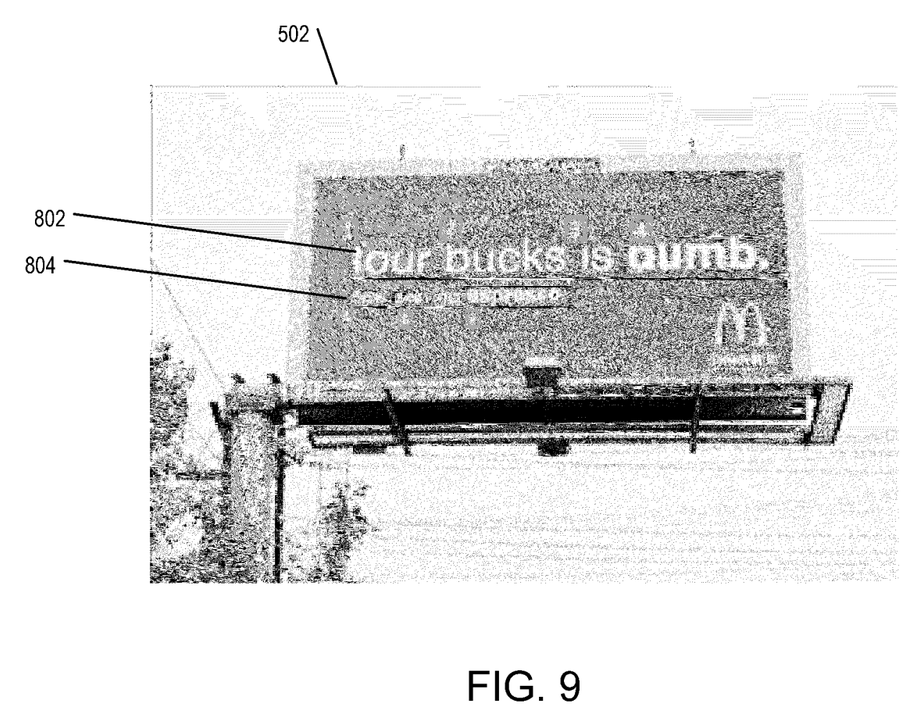
FIG. 9 illustrates an example of the image of FIG. 5 with annotated bounding boxes for a second subset of text in accordance with certain embodiments.

FIG. 9 illustrates an example of the image 502 of FIG. 5 with annotated bounding boxes for a second subset of text in accordance with certain embodiments. In certain embodiments, the second subset of text is a subset of the first subset of text included in the region 704 defined with respect to FIG. 7. In certain embodiments, the rows of lines 802 and 804 are selected using a set of cluster selection criteria as previously described with respect to the process 400. The selection criteria, in certain embodiments, is based at least in part on the number of words included in the rows 802 and 804. For example, in some cases, it is desired that 8 or less words are processed by the context postprocessor 116 as semantic output 126. In some embodiments, the determination of the first word to output as part of the semantic output 126 is based at least in part on an attention-based neural network. In certain embodiments, the determination of the first word output is based at least in part on the processes described in the '774 application previously incorporated by reference herein. In some embodiments, the lines 802 and 804 are two separate clusters of words. In other embodiments, the lines 802 and 804 are included in a single cluster of words.

Figure 10:
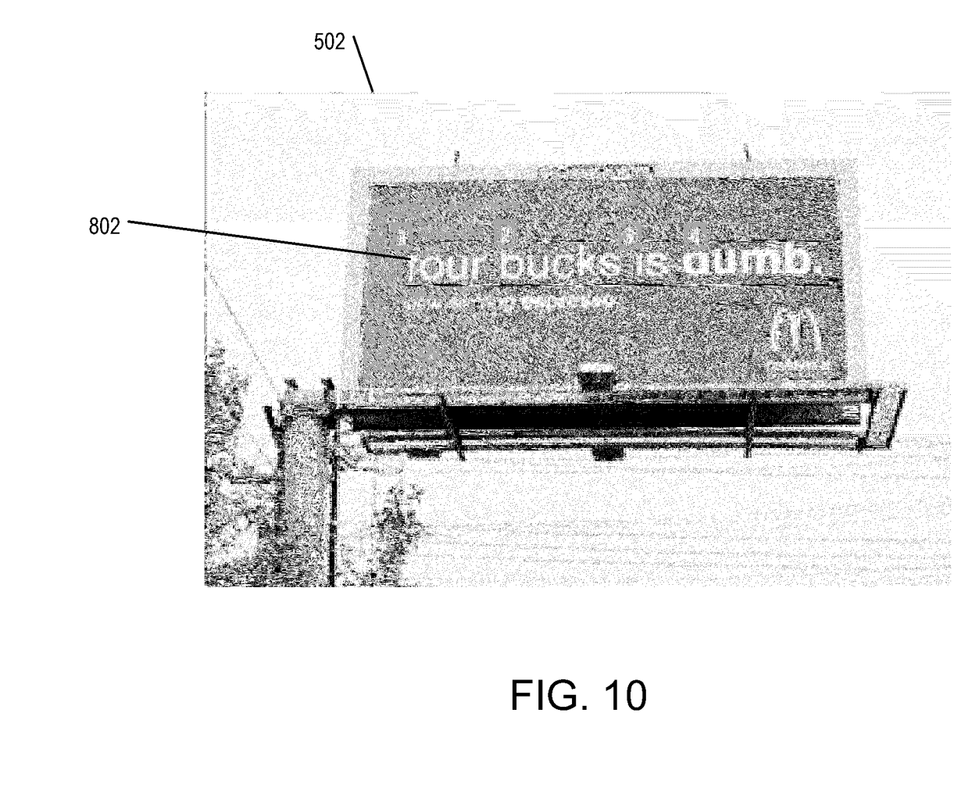
FIG. 10 illustrates an example of the image of FIG. 5 with annotated bounding boxes for a third subset of text in accordance with certain embodiments.

FIG. 10 illustrates an example of the image 502 of FIG. 5 with annotated bounding boxes for a third subset of text in accordance with certain embodiments. As illustrated in FIG. 10, in some embodiments, a single line of words is selected using the processes 300 and 400 for output to an application or a user.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
    as implemented by one or more computing devices executing specific computer-executable instructions comprising,
        identifying a set of words within an image, wherein the image comprises one or more words and one or more non-text objects;
        determining a bounding box for each word from the set of words to obtain a set of bounding boxes;
        determining an orientation vector for each bounding box of the set of bounding boxes, wherein the orientation vector of the bounding box corresponds to an orientation of the word located within the bounding box;
        for each pair of bounding boxes, determining an orientation difference between the bounding boxes of the pair of bounding boxes based at least in part on the orientation vector for each bounding box of the pair of bounding boxes;
        determining a minimum distance between bounding boxes for each pair of bounding boxes;
        determining a height of each bounding box;
        determining a center distance for each pair of bounding boxes, wherein the center distance comprises a distance between a center of each bounding box of the pair of bounding boxes;
        performing an iterative clustering process based on the orientation of each bounding box, the orientation difference for each pair of bounding boxes, the minimum distance between bounding boxes for each pair of bounding boxes, the height of each bounding box, and the center distance for each pair of bounding boxes to obtain a plurality of clusters of words from the set of words, wherein each cluster corresponds to a different line of words presented in the image;
        selecting a cluster of words from the plurality of clusters based on cluster selection criteria, the cluster selection criteria including a size of the cluster and a location of the cluster in the image;
        obtaining a rotated cluster by performing orthogonal projection on the cluster of words selected from the plurality of clusters to rotate the cluster of words along a horizontal axis and align the cluster of words with the horizontal axis;
        performing a raster scanning operation on the rotated cluster to determine the words included in the rotated cluster; and
        outputting the words to a selected target application that performs application-specific text processing.

2. The computer-implemented method of claim 1, wherein determining the height of the bounding box comprises determining a height axis of the bounding box based on the orientation of the bounding box and the orientation of words within the bounding box.

3. The computer-implemented method of claim 1, wherein determining the bounding box comprises determining coordinates for corners of the bounding box within the image.

4. The computer-implemented method of claim 1, further comprising ceasing the iterative clustering process when each cluster of the plurality of clusters includes less than a threshold number of words, wherein the threshold number of words is determined using a machine learning algorithm.

5. The computer-implemented method of claim 1, wherein the cluster of words comprises one or more words.

6. The computer-implemented method of claim 1, wherein the orientation difference between the bounding boxes of the pair of bounding boxes is determined by calculating a cosine similarity between the bounding boxes using the orientation vector for each bounding box of the pair of bounding boxes.

7. A system comprising:
    an electronic data store to at least store an image comprising text and non-text graphics;
    a computing system comprising computer hardware in communication with the electronic data store, the computing system to execute specific computer-executable instructions to at least:
        receive a set of coordinates for each of a set of bounding boxes in the image;
        derive a set of comparative data for the set of bounding boxes based at least in part on the set of coordinates for each bounding box, the set of comparative data derived by comparing a bounding box from the set of bounding boxes to at least one other bounding box from the set of bounding boxes, wherein the set of comparative data includes an orientation difference between a pair of bounding boxes obtained by comparing orientation vectors derived for each bounding box of the pair of bounding boxes;

divide the set of bounding boxes into a number of bounding box clusters based at least in part on the set of comparative data;

select a bounding box cluster based on a set of selection criteria comprising a size of the bounding box cluster and a location of the bounding box cluster in the image;

perform a text recognition operation on the bounding box cluster to recognize text included in the bounding box cluster; and output the text to a target application.

8. The system of claim 7, wherein the set of comparative data includes distance data calculated between bounding boxes of a pair of bounding boxes.

9. The system of claim 8, wherein the distance data includes a minimum distance between coordinates of each bounding box of the pair of bounding boxes that are closest to each other within a coordinate space defined for the image.

10. The system of claim 8, wherein the distance data includes a center distance between the bounding boxes of the pair of bounding boxes, the center distance a distance between the center of each of the bounding boxes of the pair of bounding boxes.

11. The system of claim 7, wherein the computing system further executes specific computer-executable instructions to at least determine an orientation vector for each bounding box of the set of bounding boxes, and wherein dividing the set of bounding boxes into the number of bounding box clusters is further based at least in part on the orientation vector for each bounding box of the set of bounding boxes.

12. The system of claim 7, wherein the computing system further executes specific computer-executable instructions to at least determine a height of each bounding box of the set of bounding boxes, and wherein dividing the set of bounding boxes into the number of bounding box clusters is further based at least in part on the height of each bounding box of the set of bounding boxes.

13. The system of claim 7, wherein dividing the set of bounding boxes into the number of bounding box clusters includes performing one or more iterative clustering processes.

14. The system of claim 13, wherein the one or more iterative clustering processes comprise one or more of the following: a density-based spatial clustering of applications with noise (DBSCAN) process, a mean shift clustering process, a centroid-based clustering process, a density-based clustering process, or a connectivity-based clustering process.

15. The system of claim 13, wherein the one or more iterative clustering processes are repeated until each cluster includes less than a threshold number of words, wherein the threshold number of words is determined based at least in part on a result of a machine learning process.

16. The system of claim 7, wherein the text recognition operation comprises a raster scan process.

17. The system of claim 7, wherein performing the text recognition operation includes performing a projection process to orient one or more words included in one or more bounding boxes of the bounding box cluster with respect to a selected axis of a coordinate space.

18. One or more non-transitory, computer-readable storage media storing computer-executable instructions, which if performed by one or more hardware processors, cause the one or more hardware processors to at least:

receive four sets of coordinate pairs for each of a set of bounding boxes in an image that depicts text and non-text objects, the four sets of coordinate pairs corresponding to four corners of a bounding box;

derive a set of metadata for the set of bounding boxes based at least in part on the four sets of coordinate pairs for each bounding box, at least some of the set of metadata determined by comparing the four sets of coordinate pairs of a first bounding box to the four sets of coordinate pairs of a second bounding box from the set of bounding boxes wherein the set of metadata includes an orientation difference between a pair of bounding boxes obtained by comparing orientation vectors derived for each bounding box of the pair of bounding boxes;

cluster the set of bounding boxes into a number of bounding box clusters based at least in part on the set of metadata;

select a bounding box cluster based at least in part on an expected amount of processor utilization to process text included in bounding boxes of the bounding box cluster;

perform a text recognition operation on the bounding box cluster to recognize text included in the bounding box cluster; and cause the text to be output for subsequent processing.

19. The one or more non-transitory, computer-readable storage media of claim 18, wherein the computer-executable instructions further cause the one or more hardware processors to at least divide the image into a set of regions, wherein the set of bounding boxes are within a particular region from the set of regions.

20. The one or more non-transitory, computer-readable storage media of claim 18, wherein performing the text recognition operation includes performing a projection process to orient one or more words included in one or more bounding boxes of the bounding box cluster with respect to a selected axis of a coordinate space.

* * * * *